United States Patent Office 3,020,014
Patented Feb. 6, 1962

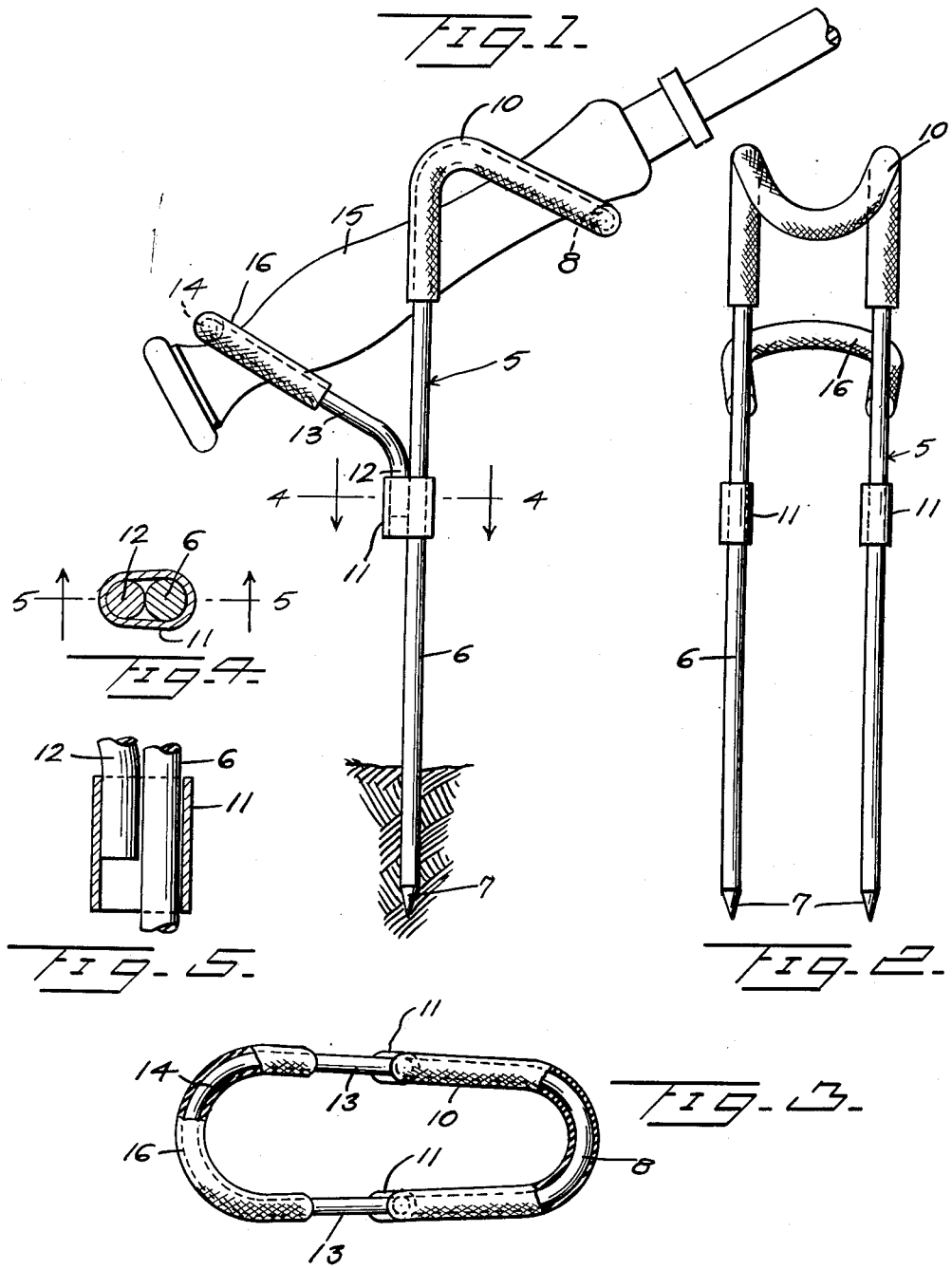

3,020,014
FISHING ROD HOLDER
Wilmont W. Emery, 4221 56th St., Sacramento 24, Calif.
Filed Apr. 9, 1959, Ser. No. 805,193
1 Claim. (Cl. 248—48)

This invention relates to a fishing rod holder designed for supporting a fishing rod at the desired angle for fishing and held in such angular position against accidental displacement.

An important object of the invention is to provide a holder or support of this character comprising a main support adapted to be driven into the ground surface, and a substantially U-shaped bracket removably secured to the main support and extended laterally therefrom, the bracket being supplied with a friction means for gripping and holding the handle of a fishing pole against slipping under strain caused by a fish attempting to obtain bait used in baiting the hook.

Another object of the invention is to provide a holder wherein the fishing pole supported by the holder will be retained in such position that a pull on the fishing rod will result in a downward pressure directed to the main support forcing the main support into the ground surface, rather than pulling the main support from its embedded position in the ground surface.

A still further object of the invention is to provide a holder or support including a main supporting member and a bracket supported thereby, the bracket and main supporting member being so constructed and arranged that the bracket may be readily removed from the main support to facilitate the storing of the holder.

Another important object of the invention is to provide a support for holding a fishing rod in the desired position, comprising a main support including prongs or supporting legs adapted to be driven into the ground surface, and a bracket embodying legs having downwardly extended ends fitted in sleeves mounted on the legs of the main support for adjustment longitudinally of the legs, the sleeves being held in their positions of adjustment by frictional contact with said legs.

With the foregoing and other objects in view which will appear as the description proceeds, the invention consists of certain novel details of construction and combination of parts, hereinafter more fully described and pointed out in the claim, it being understood that changes may be made in the construction and arrangement of parts without departing from the spirit of the invention as claimed.

Referring to the drawing:

FIGURE 1 is a side elevational view of a fishing rod holder, constructed in accordance with the invention, illustrated as supporting a fishing rod.

FIG. 2 is a front elevational view thereof.

FIG. 3 is a plan view of the holder.

FIG. 4 is a sectional view taken on line 4—4 of FIG. 1.

FIG. 5 is a sectional view taken on line 5—5 of FIG. 4.

Referring to the drawing in detail, the holder comprises a main support indicated generally by the reference character 5, the main support being preferably formed of a length of heavy wire material bent upon itself to provide spaced leg members 6 pointed at their lower ends as at 7 so that the leg members 6 may be readily driven into the ground surface.

The upper ends of the leg members 6 are connected by means of an open loop 8 that extends laterally and downwardly from the upper ends of the spaced leg members, the loop 8 being of a width to accommodate the handle of the conventional fishing rod or pole. This open loop portion 8 is covered by a rubber tube 10 which lends friction to the support to prevent the handle of the fishing pole or rod from slipping on the support.

Mounted on the spaced leg members 6, are sleeves 11, which are oval in horizontal cross section to permit of sliding movement of the sleeves 11 on the leg members 6. These sleeves 11 are of such size and shape that they will also accommodate the downturned ends 12 of the removable support 13 which embodies a length of heavy wire material formed into an open loop 14 and extended laterally with respect to the ends 12, as better shown by FIG. 1 of the drawing, the removable support being disposed below the open loop 8 to fit over the lower end of the handle 15 of the fishing rod to set up a binding action between the open loop 8 and loop 14 under the weight of the fishing rod or pole. This open loop 14 is also supplied with a rubber tubular member 16 to create friction preventing slipping of the fishing rod handle held therein.

In the use of the device the main support is driven into the ground surface, as shown by FIG. 1 of the drawing, and the removable support 13 is adjusted along the spaced leg members 6 to the desired position for supporting the fishing rod at the desired angle.

If it is desired to elevate the fishing rod to a more severe angle, it is only necessary to lower the removable support 13 on the leg members 6, the binding action set up between the sleeves 11, downturned ends 12 of the removable support 13 and leg members 6, tending to cause the sleeves to grip the leg members 6 and hold the removable support at a desired position, adapting the support for holding fishing poles or rods for various types of fishing.

It will also be seen that due to this construction, the removable support 13 may be readily disconnected from the main support, thereby reducing the space required in storing or transporting the fishing pole or rod holder, forming the subject matter of the invention.

Due to the fact that the support 13 is removable, it will be seen that the tubular member 16 may be readily replaced, when desired.

Having thus described the invention, what is claimed is:

A fishing rod support comprising a main support including spaced leg members, a supporting member in the form of an open loop connecting the upper ends of said leg members, extending laterally and downwardly therefrom, a second supporting member comprising a length of heavy wire material formed into a substantially U-shaped support having downwardly extended ends, the open side of said second supporting member being disposed downwardly, sleeves oval in cross section, slidably mounted on said leg members of said main support, the downwardly extended ends of said second supporting member being disposed within said sleeves wedged against said leg members of said main support, adjustably securing said second supporting member to said main support, said supporting members adapted to receive the handle end of a fishing rod supporting the fishing rod for fishing, and rubber tubular friction members fitting over said open loop and second supporting member for frictional contact with the handle of a fishing rod held in said supporting member, preventing accidental sliding movement of said fishing rod on said support.

References Cited in the file of this patent
UNITED STATES PATENTS

| | | |
|---|---|---|
| 2,143,109 | Hadaway | Jan. 10, 1939 |
| 2,487,094 | Brown | Nov. 8, 1949 |
| 2,592,688 | Halfpap et al. | Apr. 15, 1952 |
| 2,625,985 | Morgan et al. | Jan. 20, 1953 |

FOREIGN PATENTS

| | | |
|---|---|---|
| 13,634 | Denmark | Aug. 2, 1910 |
| 150,071 | Great Britain | Aug. 27, 1920 |